(12) United States Patent
Biesinger

(10) Patent No.: US 11,872,938 B2
(45) Date of Patent: Jan. 16, 2024

(54) MIRROR WITH INTEGRATED FAN

(71) Applicant: Munchkin, Inc., Van Nuys, CA (US)

(72) Inventor: Quinn Michael Biesinger, Los Angeles, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 29 days.

(21) Appl. No.: 15/904,194

(22) Filed: Feb. 23, 2018

(65) Prior Publication Data

US 2018/0236941 A1     Aug. 23, 2018

Related U.S. Application Data

(60) Provisional application No. 62/462,879, filed on Feb. 23, 2017.

(51) Int. Cl.
| | |
|---|---|
| *B60R 11/00* | (2006.01) |
| *B60R 1/12* | (2006.01) |
| *A47G 1/02* | (2006.01) |
| *F04D 29/00* | (2006.01) |
| *B60H 1/00* | (2006.01) |
| *B60R 1/04* | (2006.01) |

(52) U.S. Cl.
CPC ............ *B60R 11/00* (2013.01); *F04D 29/005* (2013.01); *A47G 1/02* (2013.01); *B60H 1/00521* (2013.01); *B60R 1/04* (2013.01); *B60R 1/12* (2013.01); *B60R 2011/0059* (2013.01); *B60R 2011/0071* (2013.01)

(58) Field of Classification Search
CPC ................ A47G 1/02; B60R 1/04; B60R 1/12
USPC ............................................................ 454/69
See application file for complete search history.

(56) References Cited

U.S. PATENT DOCUMENTS

| | | | | |
|---|---|---|---|---|
| 1,224,306 | A * | 5/1917 | Lemp et al. ............ | A45D 20/12 417/313 |
| 1,522,412 | A * | 1/1925 | Bordignone ............. | A47G 1/02 248/480 |
| 4,391,053 | A * | 7/1983 | Anthony ................... | A47G 1/06 40/745 |
| 4,653,201 | A * | 3/1987 | Seaman ................. | A45D 20/16 34/524 |
| 4,701,594 | A * | 10/1987 | Powell .................... | A45D 20/16 34/667 |
| 5,090,300 | A * | 2/1992 | Berenstein ............... | A47G 1/02 359/838 |
| 5,468,124 | A * | 11/1995 | Chen ....................... | F04D 25/08 416/246 |

(Continued)

FOREIGN PATENT DOCUMENTS

| | | |
|---|---|---|
| CN | 2280031 Y | 4/1998 |
| CN | 201718644 U | 1/2011 |

(Continued)

*Primary Examiner* — Edelmira Bosques
*Assistant Examiner* — Frances F. Hamilton
(74) *Attorney, Agent, or Firm* — Robert Z. Evora, Esq.

(57) ABSTRACT

A mirror assembly is described having an integrated fan, which is adapted to be used in an automobile. In some uses, the mirror assembly may be used to watch infants and toddlers and keep them cool with flowing air as needed. In other uses, the mirror assembly may be used to cool off a driver or passenger of a vehicle who has connected the mirror assembly to a visor.

14 Claims, 9 Drawing Sheets

(56) References Cited

U.S. PATENT DOCUMENTS

| | | | | |
|---|---|---|---|---|
| 5,837,167 A | * | 11/1998 | Lederer | B01F 23/21311 261/78.2 |
| 6,283,622 B1 | * | 9/2001 | Chupp | B60Q 3/233 362/136 |
| 6,857,753 B2 | * | 2/2005 | Kane | B60R 1/008 359/872 |
| 7,097,314 B1 | * | 8/2006 | Darling | B60R 1/008 359/872 |
| 7,862,189 B1 | * | 1/2011 | Freese | G02B 7/1822 359/872 |
| 7,942,536 B1 | * | 5/2011 | Johnson | A47G 1/02 359/854 |
| 8,128,245 B2 | * | 3/2012 | Limjoco | A45D 42/18 359/872 |
| D738,118 S | | 9/2015 | Gyanendra et al. | |
| D824,012 S | * | 7/2018 | Xu | D6/309 |
| 10,082,286 B1 | * | 9/2018 | Huang | G02B 6/0008 |
| 10,101,020 B2 | * | 10/2018 | Hung | F04D 29/325 |
| D874,160 S | * | 2/2020 | Biesinger | D23/370 |
| 10,975,876 B2 | * | 4/2021 | Lin | F04D 29/005 |
| 2004/0179282 A1 | * | 9/2004 | Kane | B60R 1/008 359/879 |
| 2005/0068646 A1 | * | 3/2005 | Lev | A45D 42/24 359/432 |
| 2007/0248476 A1 | * | 10/2007 | Lewis | F04D 25/0613 417/423.1 |
| 2007/0258833 A1 | * | 11/2007 | Santa Anna | F04D 25/12 417/321 |
| 2008/0073947 A1 | * | 3/2008 | Hagler-Gray | B60H 1/00264 297/180.14 |
| 2010/0073792 A1 | * | 3/2010 | Limjoco | A45D 42/18 359/872 |
| 2010/0118520 A1 | * | 5/2010 | Stern | A45D 42/10 362/135 |
| 2010/0175556 A1 | * | 7/2010 | Kummer | B01D 46/52 55/471 |
| 2011/0280726 A1 | * | 11/2011 | Ochoa | F04D 25/0673 416/63 |
| 2013/0077292 A1 | * | 3/2013 | Zimmerman | A47G 1/20 362/142 |
| 2013/0235607 A1 | * | 9/2013 | Yang | F21V 33/0004 362/140 |
| 2017/0087500 A1 | * | 3/2017 | Combs | F24F 7/06 |
| 2017/0181528 A1 | * | 6/2017 | Zimmerman | F04D 29/646 |
| 2018/0263362 A1 | * | 9/2018 | Yang | F21V 33/004 |
| 2019/0038004 A1 | * | 2/2019 | Chen | F04D 25/084 |
| 2019/0351360 A1 | * | 11/2019 | Plotkin | F04D 25/0673 |
| 2020/0114734 A1 | * | 4/2020 | Zuberbuehler | B60H 3/06 |
| 2022/0010799 A1 | * | 1/2022 | Park | F04D 17/06 |

FOREIGN PATENT DOCUMENTS

| | | | | |
|---|---|---|---|---|
| CN | 202483912 U | | 10/2012 | |
| KR | 200452840 Y1 | * | 3/2011 | |
| KR | 20180006042 A | * | 7/2016 | |
| KR | 200493077 Y1 | * | 4/2018 | |
| KR | 102089160 B1 | * | 7/2018 | |
| WO | WO-2006013780 A1 | * | 2/2006 | B60H 3/00 |

* cited by examiner

MIRROR WITH INTEGRATED FAN

CROSS REFERENCE TO RELATED APPLICATION

This application claims priority to U.S. Provisional Application Ser. No. 62/462,879 filed Feb. 23, 2017, the contents of which are hereby incorporated by reference herein in their entirety into this disclosure.

TECHNICAL FIELD

The subject disclosure relates generally to the field of mirrors. In particular, the subject disclosure relates to a mirror with integrated fan.

SUMMARY

A mirror assembly having a housing, a mirror and a fan. The mirror may be positioned within the housing, while the fan may be disposed within the housing. The fan may also be adapted to move in relation to the housing. The mirror assembly may also be adapted to connect to a headrest or a front visor of an automobile. In some uses, the mirror assembly may be used to watch infants and toddlers and keep them cool with flowing air as needed. In other uses, the mirror assembly may be used to cool off a driver or passenger of a vehicle who has connected the mirror assembly to a visor.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figures. As shown in FIGS. 1-10, an exemplary embodiment of the present subject disclosure is a fan mirror assembly 10. The fan mirror assembly 10 has a fan 100 integrated into a mirror assembly.

Figure 1:
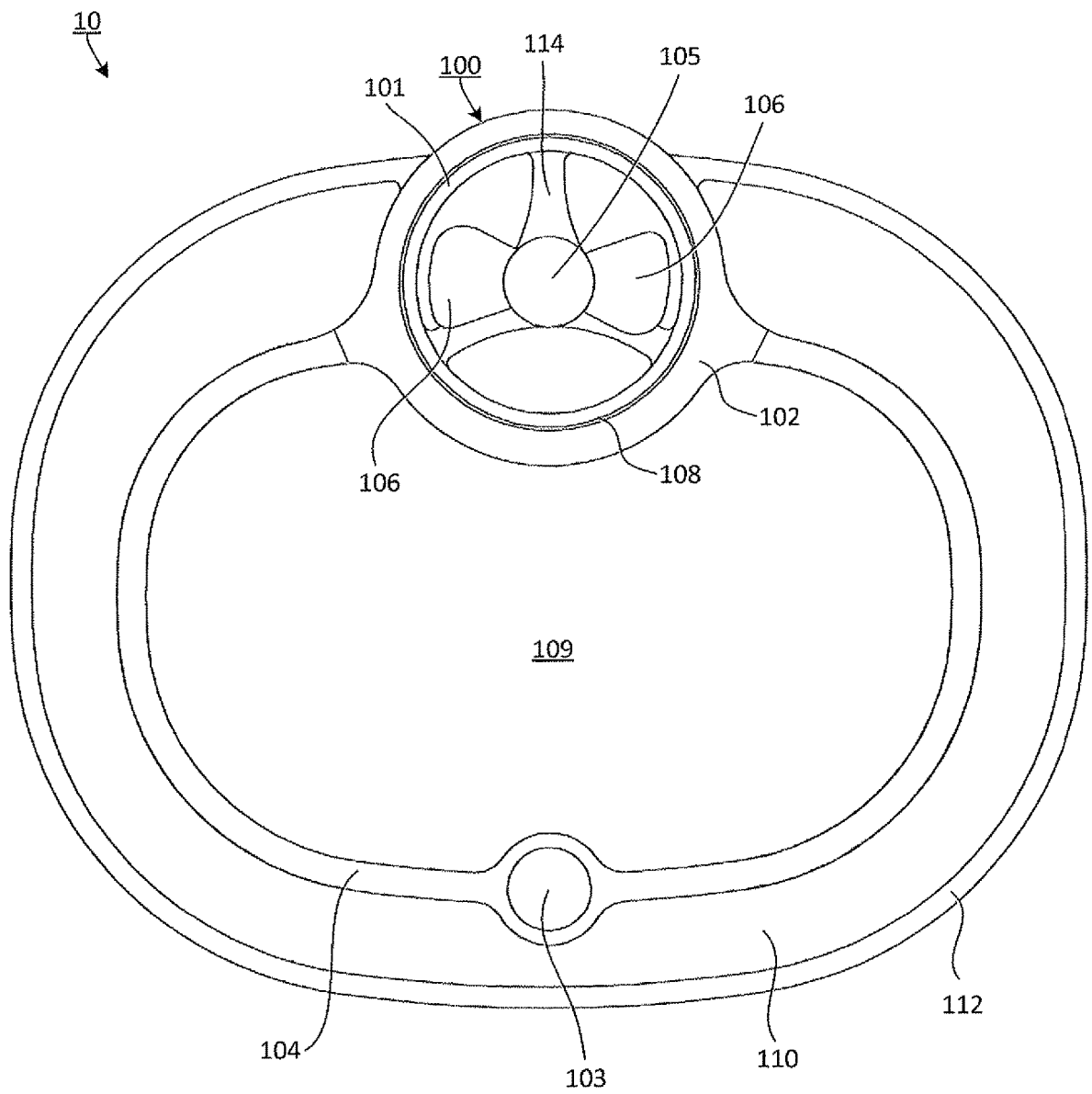
FIG. 1 is a front view of a mirror with integrated fan, according to an exemplary embodiment of the present subject disclosure.
Figure 5:
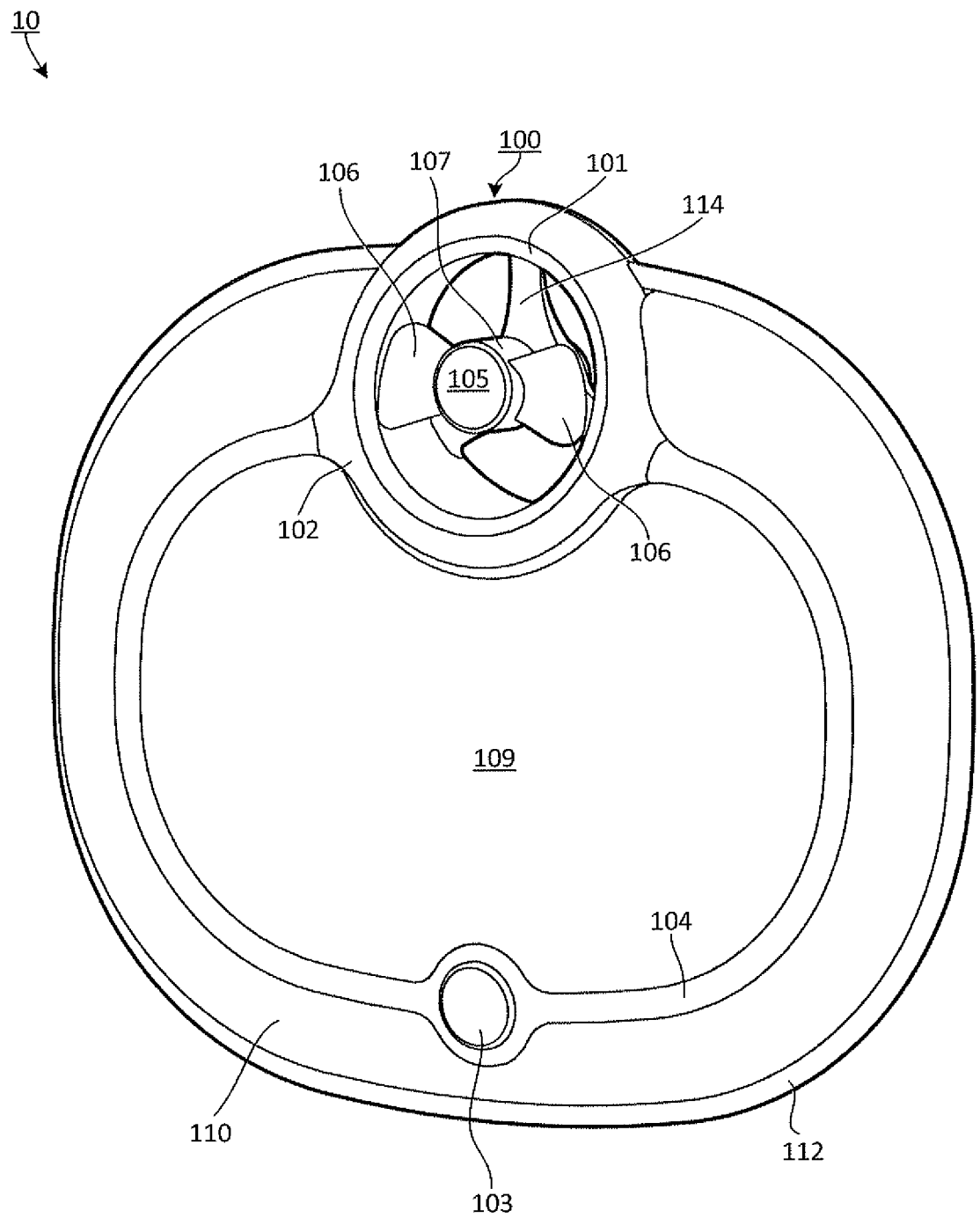
FIG. 5 is a perspective view of the mirror with integrated fan of FIG. 1.

FIGS. 1 and 5 illustrate, the mirror assembly including a mirror front housing 110 that encircles a mirror frame 104, which encircles a mirror 109. The mirror frame 104 secures a mirror 109 in a mirror front housing 110.

A button 103, which can be an off/on/fan speed button, controls the operation of the fan 100 within a fan middle housing 108. A person of ordinary skill in the art would understand that the fan may be capable of operating at a variety of different speeds. Although a button 103 is shown to be disposed directly in the mirror frame 104, the button 103 may be disposed in any other position in the fan mirror assembly 10. Furthermore, the button 103 may be a switch or any other similar structure that allows for controlling operation of the fan 100.

As further shown in FIG. 1, the fan mirror assembly 10 may further have a fan 100. The fan 100 may have fan rim 101 which rests upon a fan front housing 102 and secures to a fan middle housing 108, which is supported by a spoke housing or fan back housing 114. Within the fan middle housing 108 is a set of fan blades 106 which are positioned about a rotating shaft 107 (as shown more clearly in FIGS. 5, 7 and 8), held in place by a blade cap 105, and driven by a motor 113 (as most clearly shown in FIGS. 7 and 8). Although shown as separate units, the mirror frame 104 and the fan front housing 102 may be one integral unit.

The fan 100 may be positioned at an end of the mirror 109. As shown in FIG. 1, the fan 100 may also border the mirror 109 with mirror frame 104 in a manner to substantially encircle the mirror 109. The fan 100 may also be horizontally positioned near the center of the fan mirror assembly 10.

Figure 2:
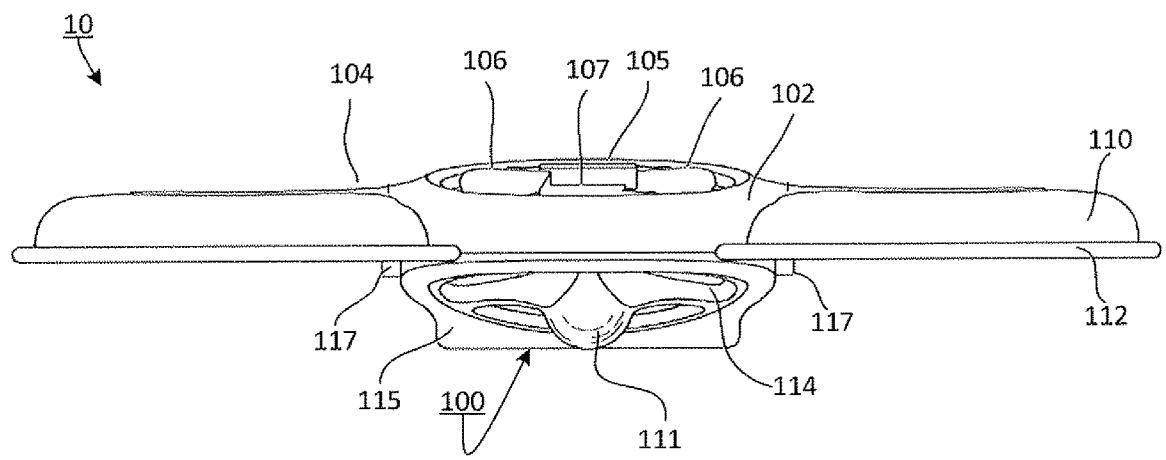
FIG. 2 is a top view of the mirror with integrated fan of FIG. 1.
Figure 3:
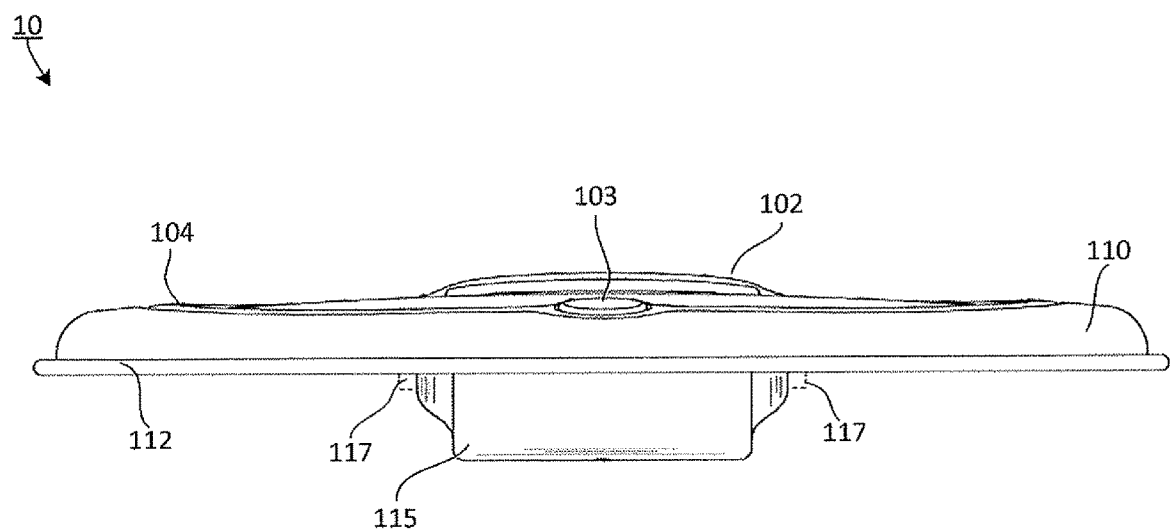
FIG. 3 is a bottom view of the mirror with integrated fan of FIG. 1.
Figure 4:
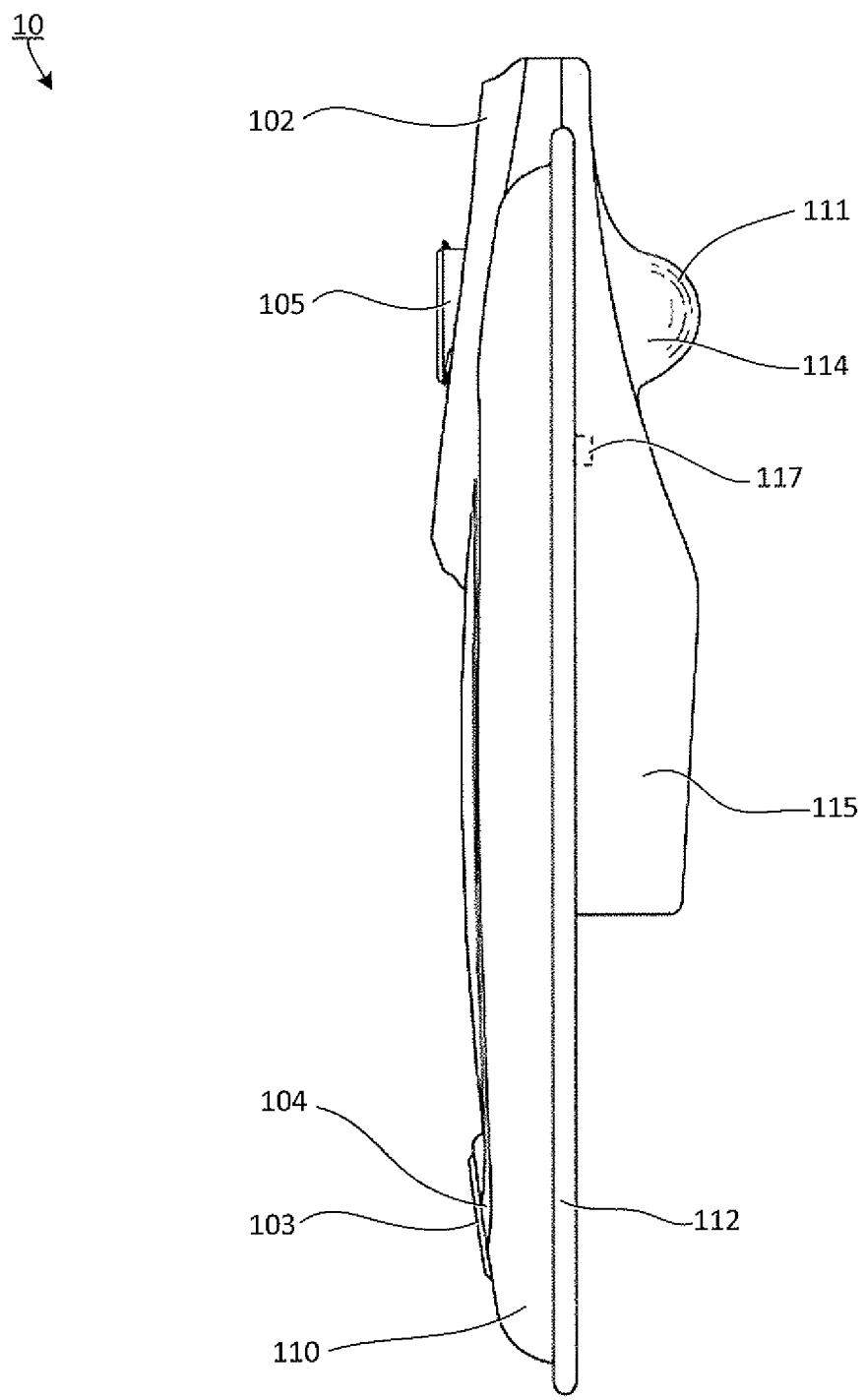
FIG. 4 is a side view of the mirror with integrated fan of FIG. 1.
Figure 8:
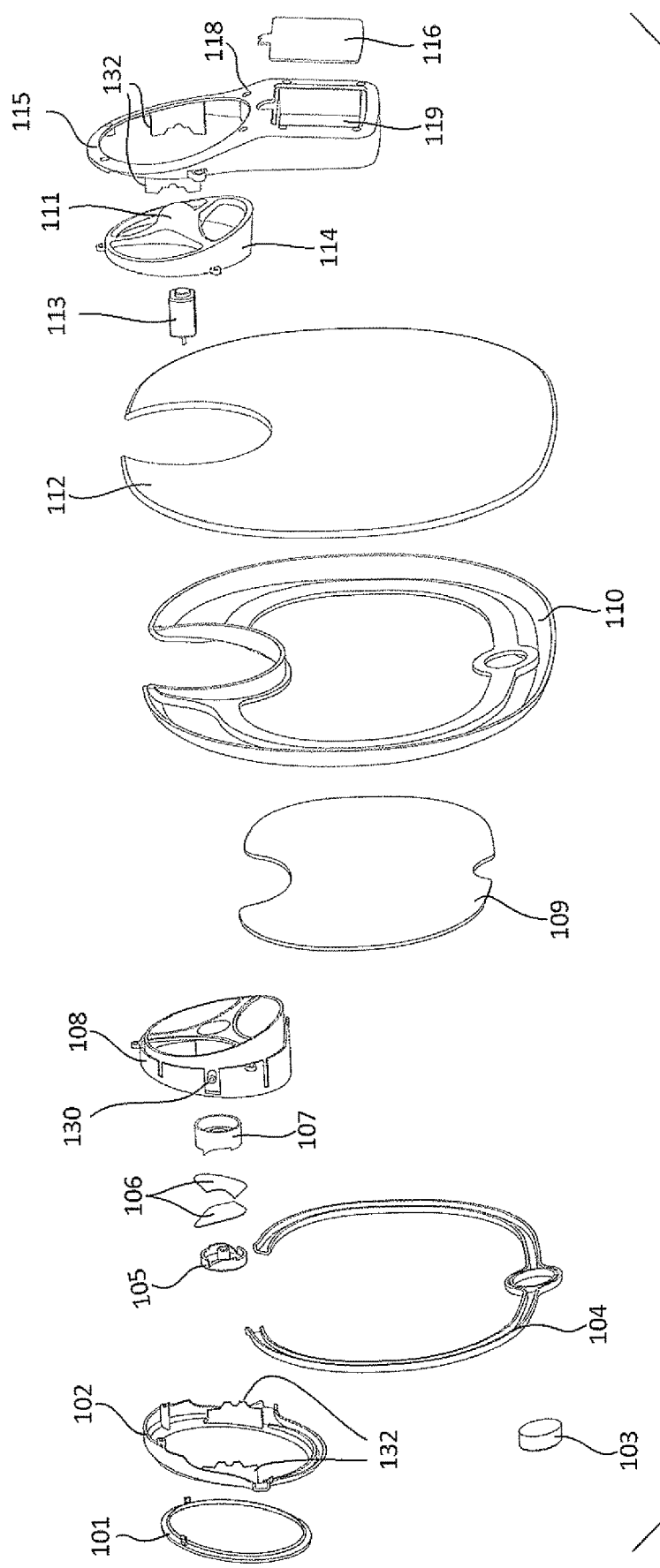
FIG. 8 is a back perspective exploded view of the mirror with integrated fan of FIG. 1.

FIGS. 2-4 show the fan front housing 102 and the fan back housing 114 connected together being of a wider width than the mirror front housing 110 and the mirror back housing 112 to compensate for the fan 100. However, it is to be understood that the widths of the fan front housing 102 and the fan back housing 114 may be of any widths to properly encase the fan 100. Furthermore, the mirror front housing 110 and the mirror back housing 112 may be of a wider width to create a seamless design. In other words, the fan front housing 102, the fan back housing 114, the mirror front housing 110 and mirror back housing 112 may all be of any varying widths to encase the mirror and the fan 100. Similarly, the fan back housing 114 may have a bulbous center point 111 to allow the motor 113 (as shown in FIG. 8) to fit inside. Again, it is to be understood that the depth of fan back housing 114 may be of any depth to allow for proper encasing of the fan 100.

The fan front housing 102 and the fan back housing 114 may be constructed of a variety of different materials, including but not limited to foam, rigid material, fabric, steel, finished wood, cardboard and the like. It is to be understood that the fan front housing 102 and the fan back housing 114 need not be constructed of the same materials. Furthermore, the fan front housing 102 and the fan back housing 114 may be similarly held together by a variety of materials, including but not limited to stitches, wires, plastic, glue, screws, buckles and the like.

Figure 6:
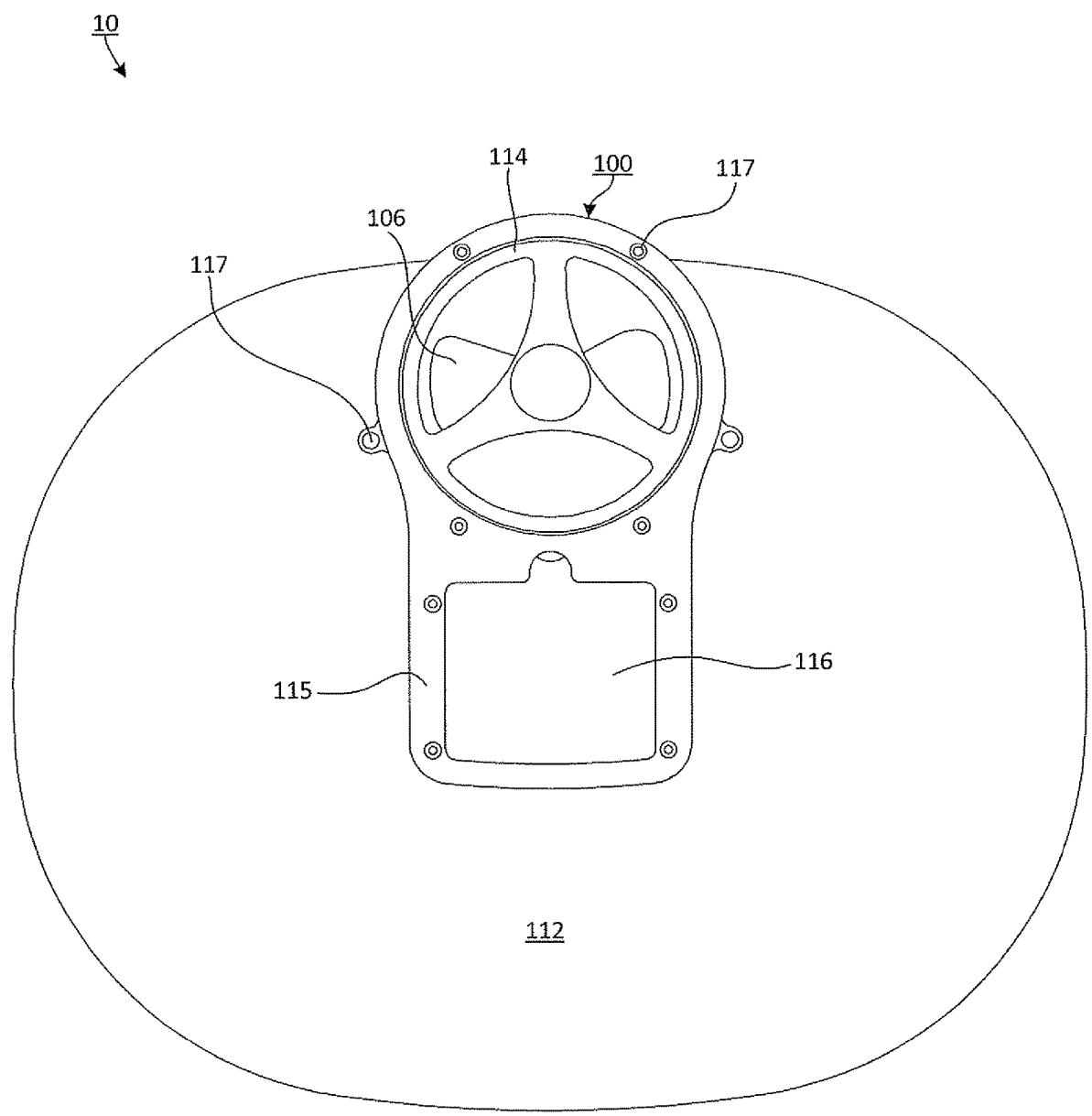
FIG. 6 is a back view of the mirror with integrated fan of FIG. 1.

FIG. 6 depicts the back of the fan mirror assembly 10 having a mirror back housing 112, which provides back support to the mirror 109. A back housing 115 disposed on the mirror back housing 112 serves to secure the fan back housing 114 and the mirror rear housing 112 together. Although shown using screws 117, the back housing 115 may be attached to the mirror back housing 112 through any conventional methods, including but not limited to screws, glue, co-molding and other methods.

A battery housing 119 may be integrated into the back housing 115. On the back housing 115 may be a battery door 116, which is opened to insert or replace batteries which power the operation of the fan 100, secures batteries within a battery compartment in the back housing 115. The power supplied may be provided from various sources, such as solar, a wired plug, etc.

Figure 7:
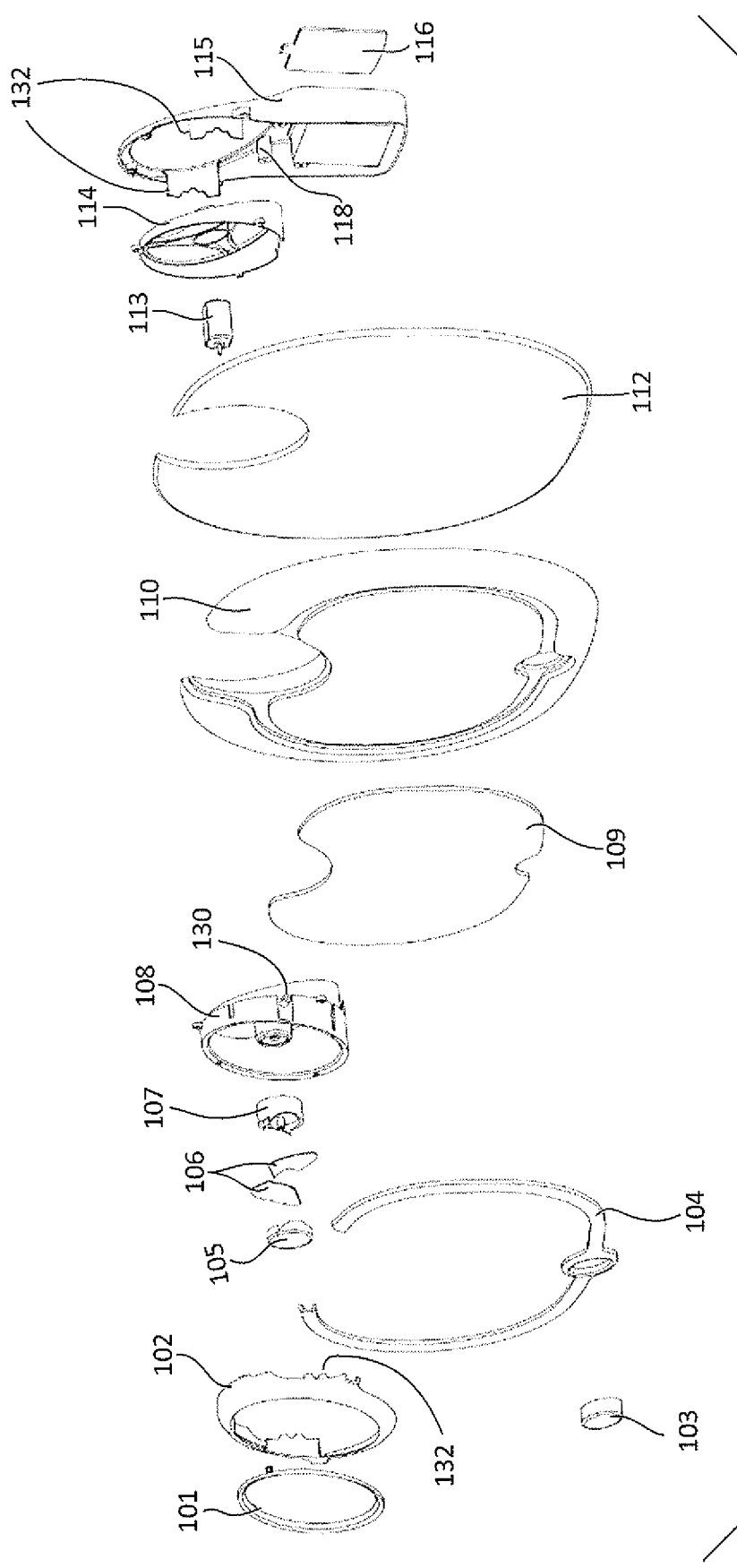
FIG. 7 is a front perspective exploded view of the mirror with integrated fan of FIG. 1.

FIGS. 7 and 8 illustrates that the fan 100 may have a fan rim 101, which is designed to fit inside fan front housing 102. Fan front housing 102 is adjacent to mirror frame 104, which has button 103 disposed therein and secures the mirror 109 against the mirror front housing 110 that is attached to the mirror back housing 112. Fan front housing 102 also holds down fan middle housing 108.

A rotating shaft 107 lies between fan front housing 102 and fan middle housing 108. The rotating shaft 107 may have the fan blades 106 disposed thereon and is covered by the blade cap 105. The rotating shaft 107 is driven by the motor 113, which may be disposed between the fan middle housing 108 and fan back housing 114. The fan back housing 114 is secured in place by back housing 115.

Back housing 115 may have apertures 118 disposed therein for screws, bolts, rivets or the like 117 to secure the back housing 115 to the mirror back housing 112. The fan back housing 114 may similarly have apertures that may align with apertures 118 on back housing 115 to further secure the fan back housing 114 within the back housing 115. The fan back housing 114 may also have a battery door 116 to secure batteries within the battery housing 119 that may be defined within the back housing 115.

FIGS. 7 and 8 depict a protrusion 130 provided in the fan middle housing 108, which may be disposed between alignment ridges 132 of the fan front housing 102 and the back housing 115. The protrusion 130 may be substantially cylindrical in shape, which allows the fan middle housing 108 to pivot, move and/or tilt in relation to the housing and thereby adjust the direction of the airflow. Although not shown, another embodiment may be designed to incorporate a gimbal-like movement so that the fan 100 can tilt freely in any direction. In one example, another similar protrusion that may be provided to create a ball and socket joint with a mating cavity in another embodiment of the back housing 115. For example, the second embodiment of the back housing 115 may have a similar center as the center in the fan back housing 114. This would allow for further movement and/or adjustment of the fan 100 to control the direction of the airflow. Similarly, the bulbous center point 111 of the fan back housing 114 may act as the protrusion to fit inside the mating cavity in the other embodiment of the back housing.

Figure 9:
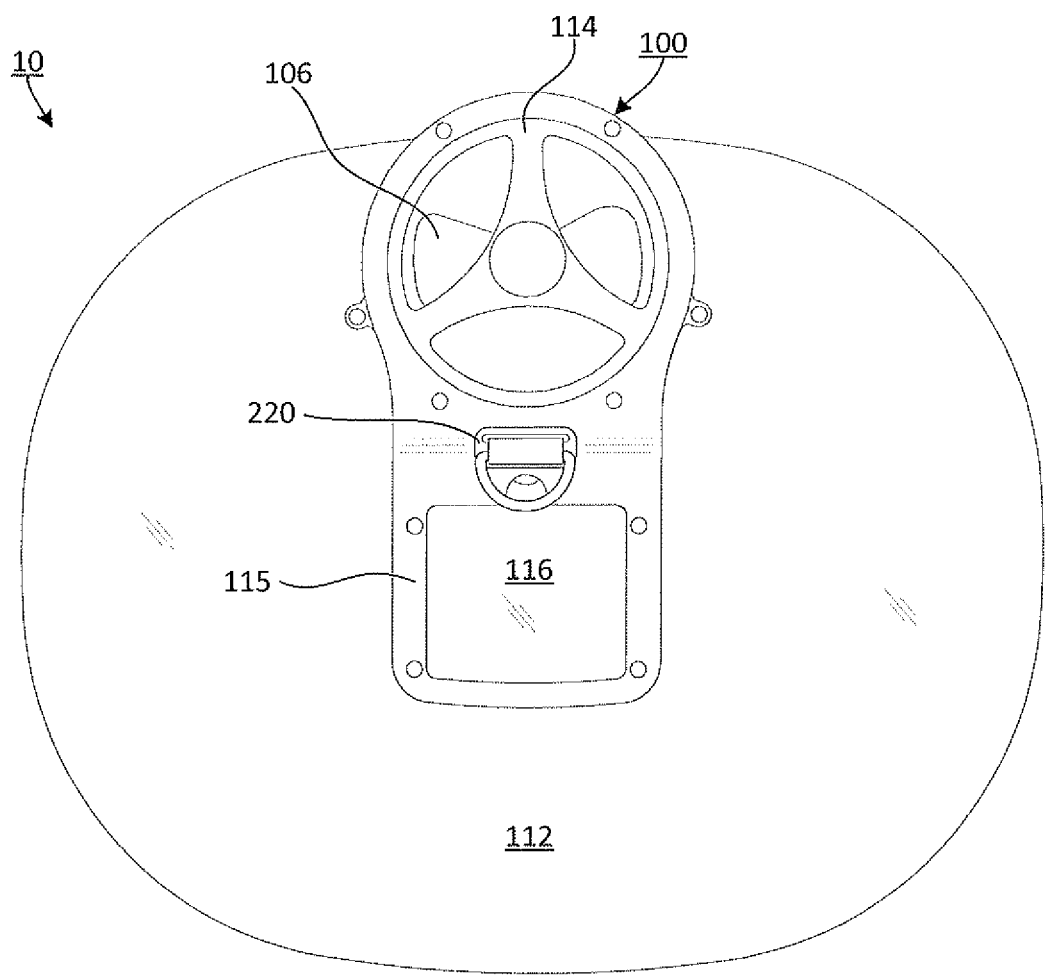
FIG. 9 is a back view of a second embodiment of a mirror with integrated fan.

In FIG. 9, the fan mirror assembly 10 may also have a ring 220 disposed on the back housing 115. The ring 220 may be used in conjunction with a hook or strap to hold the fan mirror assembly 10. The fan mirror assembly 10 may be secured via the ring 220 to various locations such as within a vehicle to a head rest, a car seat, etc.

Figure 10:
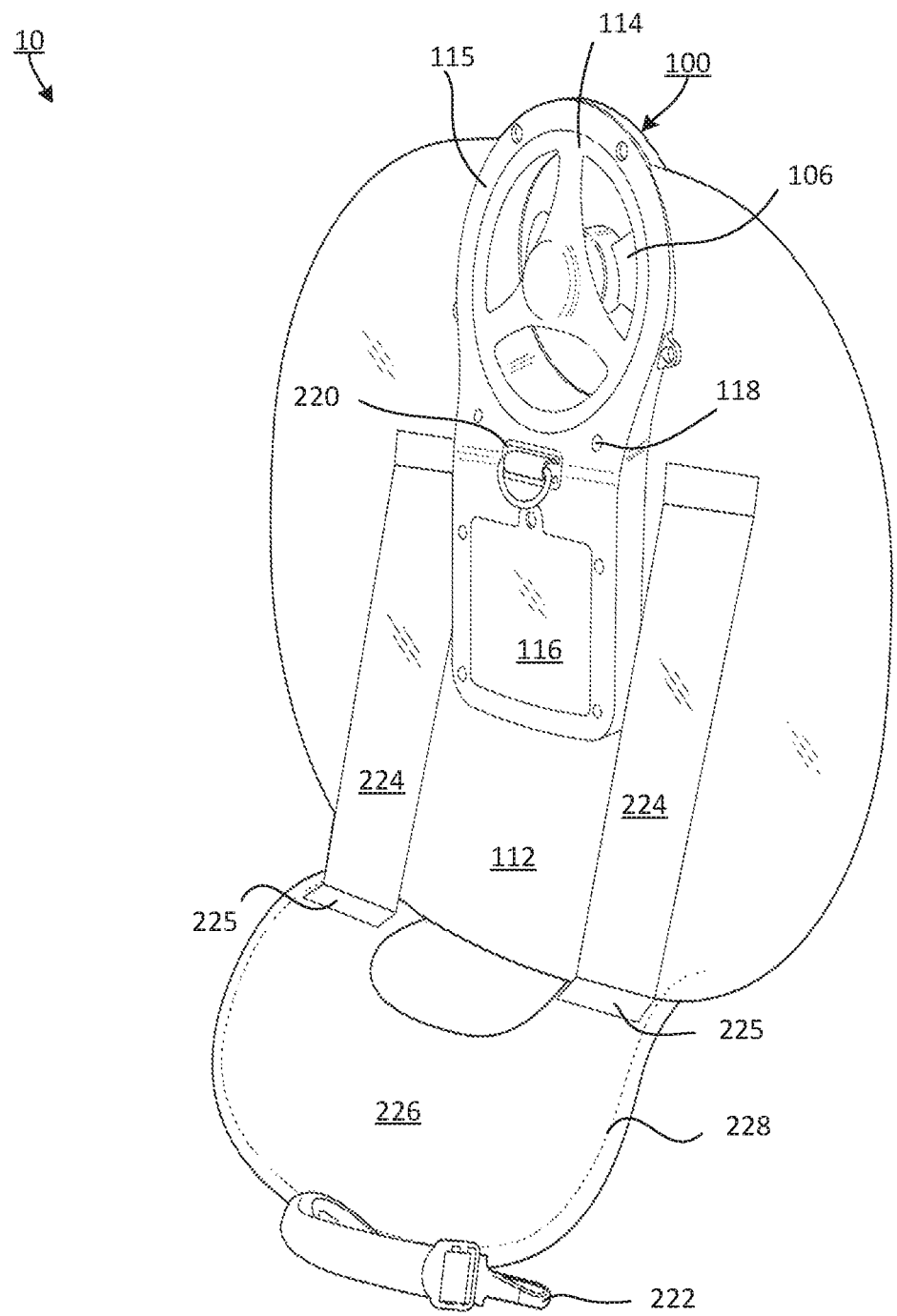
FIG. 10 is a back view of a third embodiment of a mirror with integrated fan.

FIG. 10 shows the fan mirror assembly 10 may also have straps 224 that may be removably or permanently attached to the fan mirror assembly 10. Although showed attached to the mirror back housing 112, it is to be understood that the straps 224 can be attached to any portion of the fan mirror assembly 10. As shown, the straps 224 extend out from the mirror back housing 112. Although FIG. 10 shows the straps 224 being removably attached to a flap 226 that protrudes from the fan mirror assembly 10 via a securing mechanism 225, such as Velcro pads, the straps may also be permanently attached to the flap 226. It is to be understood that the straps 224 and the flap 226 may be disposed on and protrude from the fan mirror assembly 10 in any location that provides support in more than one direction.

The flap 226 may also have a secondary securing mechanism 222. This secondary securing mechanism 222 may be capable of fastening to the ring 220, creating a circle that may envelope and be secured to an object, such as a headrest of a car seat.

A wire 228, or other rigid element, may be disposed within the flap 226. This wire may provide further support to the flap 226 to provide enhanced rigidity to the flap 226. The wire 228 may be made of any resilient material, such as thin steel, copper, plastic and the like. Due to its resiliency, the wire 228 may be molded or manipulated by a user to form different geometric shapes. For example, a user may bend the wire at two points in the same general direction to allow the flap 226 to become a base for the mirror assembly to lean against.

It is further contemplated that the fan mirror assembly 10 may be outfitted with a set of louvers (not shown) which are positioned in front of and cover the fan blades 106 and direct air flow in a desired direction. The louvers may be positioned within the fan front housing 102.

In operation, the fan mirror assembly 10 may be attached to various locations, including, for example, the back side of a headrest of an automobile. The mirror 109 may be used by parents or drivers to maintain a constant visual contact with infants or toddlers who are strapped into car seats which are facing the front or rear of the vehicle. The parent or driver can position the fan mirror assembly 10 so that there is a reflected line of sight between the parent and the automobile's rear view mirror, and the fan mirror assembly 10, which shows the face of the infant. Further, the fan mirror assembly 10 is used to cool off the infant by operating the fan to direct air over the face or body of the infant or toddler. The fan 100 operation may be controlled through button 103, and/or remote control by the parent using a standard remote control.

In use, the fan mirror assembly 10 may be used and attached as described in U.S. Pat. No. 7,097,314, which is incorporated by reference herein in its entirety into this disclosure. The connecting technique and straps described in the incorporated patent may also be implemented in the present subject disclosure.

The fan mirror assembly 10 is not limited to use for infants or toddlers but may also be used by drivers or passengers of automobiles to allow air flow to be directed toward the driver or simply just to allow circulation to occur. This is particularly helpful for drivers who are on road trips or particularly tired or sleepy. The increased air flow by the use of the fan 100 on the fan mirror assembly 10 serve to keep the driver alert during the drive by providing fresh oxygen to the face of the driver. The mirror assembly is particularly useful for professional drivers, such as truckers, tax drivers, police officers, and the like.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described but is intended to cover all modifications and changes within the scope and spirit of the subject disclosure.

What is claimed is:

1. A mirror assembly, comprising:
   a substantially oval mirror housing comprising;
   a substantially oval mirror frame defining an innermost edge of the mirror housing;
   a substantially oval mirror front housing positioned on an outer edge of the mirror frame; and
   a substantially oval mirror back housing positioned on an outer edge of the mirror front housing and substantially defining an outermost edge of the mirror housing;
   a substantially oval mirror positioned within an interior edge of the mirror frame; and
   a circular fan assembly comprising:
   a circular fan middle housing that contains a fan and is adapted to move in relation to the mirror housing and control a direction of an airflow outward from a front face of the substantially oval mirror;
   a fan back housing; and
   a back housing;
   wherein the circular fan assembly extends through the substantially oval mirror housing, such that an outer arc of the circular fan assembly extends rearwardly from an outermost edge of the back housing and an inner arc of the circular fan assembly extends in from an innermost edge of the mirror frame; and
   a fan operation control button extends in from the innermost edge of the mirror frame.

2. The mirror assembly of claim 1, wherein the housing is adapted to connect to a front visor of an automobile.

3. The mirror assembly of claim 1, wherein the mirror housing is adapted to connect to a head rest of an automobile.

4. The mirror assembly of claim 1, further comprising a protrusion on the fan middle housing that pivotably connects to the mirror housing and allows the fan to move in relation to the mirror housing.

5. A mirror assembly, comprising:
   a substantially oval mirror housing comprising;
   a substantially oval mirror frame defining an innermost edge of the mirror housing;
   a substantially oval mirror front housing positioned on an outer edge of the mirror frame; and
   a substantially oval mirror back housing positioned on an outer edge of the mirror front housing and substantially defining an outermost edge of the mirror housing;
   a substantially oval mirror positioned within an interior edge of the mirror frame;
   a circular fan assembly, having a circular fan front housing, a circular fan middle housing that contains a fan, a fan back housing; and
   a back housing, the circular fan assembly extending through the substantially oval mirror housing such that an outer arc of the circular fan assembly extends rearwardly from an outermost edge of the back housing and an inner arc of the circular fan assembly extends in from an innermost edge of the mirror frame; and
   a protrusion on the fan assembly that pivotably connects to the mirror housing and allows the fan to move in relation to the mirror housing and control a direction of an airflow outward from a front face of the oval mirror; and
   a fan operation control button extends in from the innermost edge of the mirror frame.

6. The mirror assembly of claim 5, further comprising a securing mechanism that is adapted to secure the mirror assembly to a front visor of an automobile.

7. The mirror assembly of claim 5, further comprising a securing mechanism that is adapted to secure the mirror assembly to a head rest of an automobile.

8. A mirror assembly, comprising:
   a substantially oval mirror housing comprising;
   a substantially oval mirror frame defining an innermost edge of the mirror housing;
   a substantially oval mirror front housing positioned on an outer edge of the mirror frame; and
   a substantially oval mirror back housing positioned on an outer edge of the mirror front housing and substantially defining an outermost edge of the mirror housing;
   a substantially oval mirror positioned within an interior edge of the mirror frame;
   a circular fan assembly having a circular fan front housing, circular fan middle housing, a fan adapted to blow an airflow outward from a front face of the substantially oval mirror and having a fan back housing; and
   a back housing, the fan assembly extending through the substantially oval mirror housing such that an outer arc of the circular fan assembly extends rearwardly from an outermost edge of the back housing and an inner arc of the circular fan assembly extends in from an innermost edge of the mirror frame; and
   a switch extends in from the innermost edge of the mirror frame to control operation of the fan.

9. The mirror assembly of claim 8, wherein the housing is adapted to connect to a from visor of an automobile.

10. The mirror assembly of claim 9, wherein the mirror housing is adapted to connect to the front visor of the automobile via a securing mechanism that secures the mirror housing to the front visor of the automobile.

11. The mirror assembly of claim 8, wherein the mirror housing is adapted to connect to a head rest of an automobile.

12. The mirror assembly of claim 11, herein the mirror housing is adapted to connect to the head rest of the automobile via a securing mechanism that secures the mirror housing to the head rest of the automobile.

13. The mirror assembly of claim 11, wherein the mirror housing is also adapted to connect to a front visor of the automobile.

14. The mirror assembly of claim 8, further comprising a protrusion on the fan assembly that pivotably connects to the mirror housing and allows the fan to move in relation to the mirror housing and control a direction of the airflow.

* * * * *